March 8, 1927.

A. B. HAGEMAN 1,619,819

GATE

Filed Nov. 19, 1925

Inventor

A. B. HAGEMAN,

By Jerry A. Mathews

Attorney

UNITED STATES PATENT OFFICE.

AUGUSTUS B. HAGEMAN, OF BROKEN BOW, NEBRASKA.

GATE.

Application filed November 19, 1925. Serial No. 70,138.

My invention relates to improvements in gates.

An important object of the invention is to provide a gate of the wire or flexible type, which is extremely simple in construction, adapted to hold the wires thereof taut, and is adjustable within limits, for this purpose.

Figure 1:
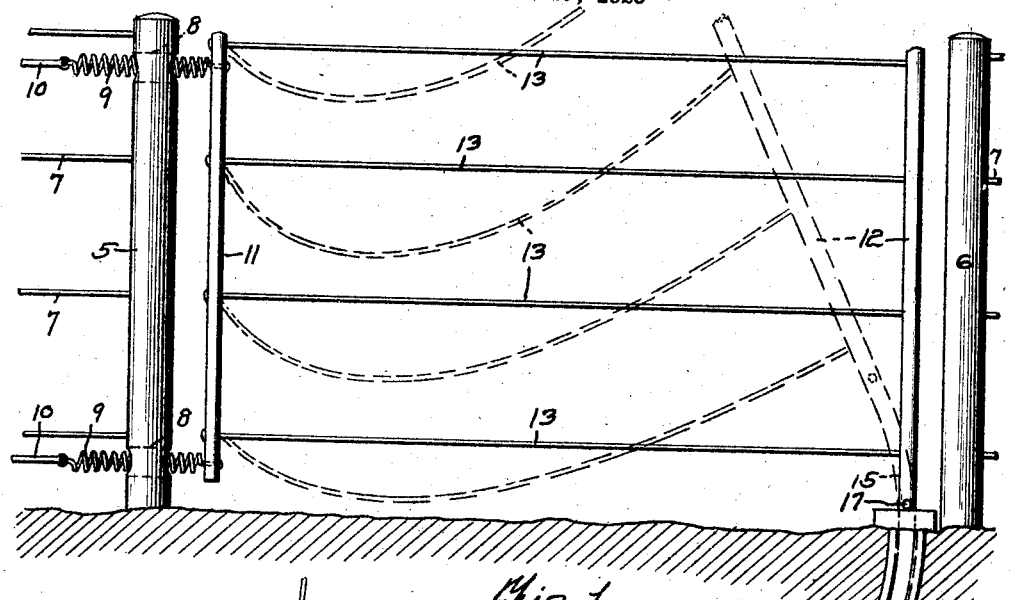
Figure 2:
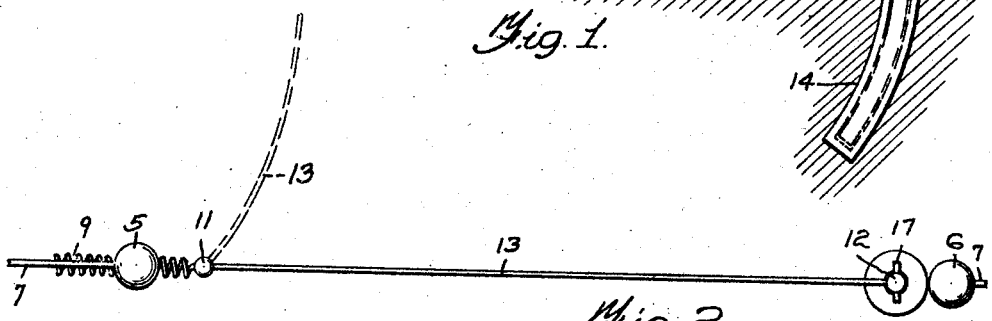
Figures 3, 4:
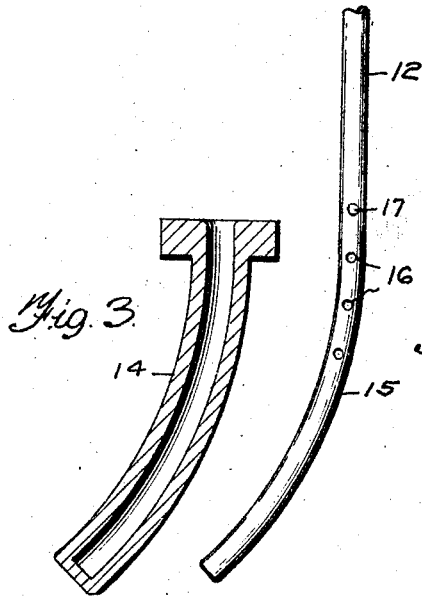

In the accompanying drawings, forming a part of this specification and in which like numerals are employed to designate like parts throughout the same, Figure 1 is a side elevation of a gate embodying my invention, Figure 2 is a plan view of the same, Figure 3 is a central longitudinal section through the curved end socket, and, Figure 4 is a fragmentary side elevation of the gate end member.

In the drawings, wherein for the purpose of illustration, is shown a preferred embodiment of my invention the numerals 5 and 6 designate fence posts providing the gate opening. These fence posts have connection with the wires 7, included in the fence. The post 5 is provided with horizontal openings 8, receiving therethrough retractile coil springs 9, the outer ends of which are attached to wires 10, which are anchored to the next fence post, not shown.

The gate which is flexible, embodies gate end members 11 and 12, in the form of rigid bars. These bars 11 and 12 are connected by wires 13, or other flexible elements.

Suitably anchored in the ground, between the posts 5 and 6, and adjacent to the post 6, is a longitudinally curved socket 14, adapted for the reception of the longitudinally curved extension 15 of the gate end bar 12. The bar 12 is provided with a plurality of vertically spaced openings 16, receiving therein a transverse pin 17, serving as a stop. The curvature of the socket 14 is concentric with the lower end of the post 5.

In operation, when the bar 12 is removed from the socket 14, the gate may be swung to the open position, as it is flexible for this purpose. When the gate is closed, the curved end 15 of the bar 12 is passed into the socket 14, and the bar will be held in a vertical position, or slightly inclined away from the post 5. The bar 12 will now place the springs 9 under tension, and the wires 13 will be held taut. It is obvious that by moving the bar 12 downwardly a greater distance, the tension upon the springs 9, may be increased, as the inclination of the bar 12, from the post 5, will be increased.

It is to be understood that the form of my invention herewith shown and described is to be taken as a preferred example of the same and that various changes in the shape, size and arrangement of parts, may be resorted to, without departing from the spirit of my invention, or the scope of the subjoined claims.

Having thus described my invention, what I claim is:

1. A combination with a pair of spaced fence posts providing a gate opening, of a gate arranged between the posts including gate end bars, one bar having a curved extension at its lower end, retractile coil springs supported by one fence post and attached to the other gate end bar, anchor means for the coil springs and a curved socket anchored in the ground adjacent to the other gate end post and receiving the said curved extension of the first gate end bar.

2. A gate including a pair of end bars, one end bar having a curved extension, resilient means secured to one end bar, and a curved socket to be anchored in the ground and adapted to receive the curved extension.

3. A gate including a pair of end bars, one end bar having a curved extension, provided with a plurality of spaced openings, resilient means connected with one end bar, and a curved socket to be anchored in the ground to receive the curved extension, and a stop pin for insertion within a selected opening in the curved extension.

In testimony whereof I affix my signature.

AUGUSTUS B. HAGEMAN.